Aug. 9, 1927.
A. F. COOKE
1,638,244
CONTINUOUS WEIGHING APPARATUS
Filed March 5, 1926
2 Sheets-Sheet 1
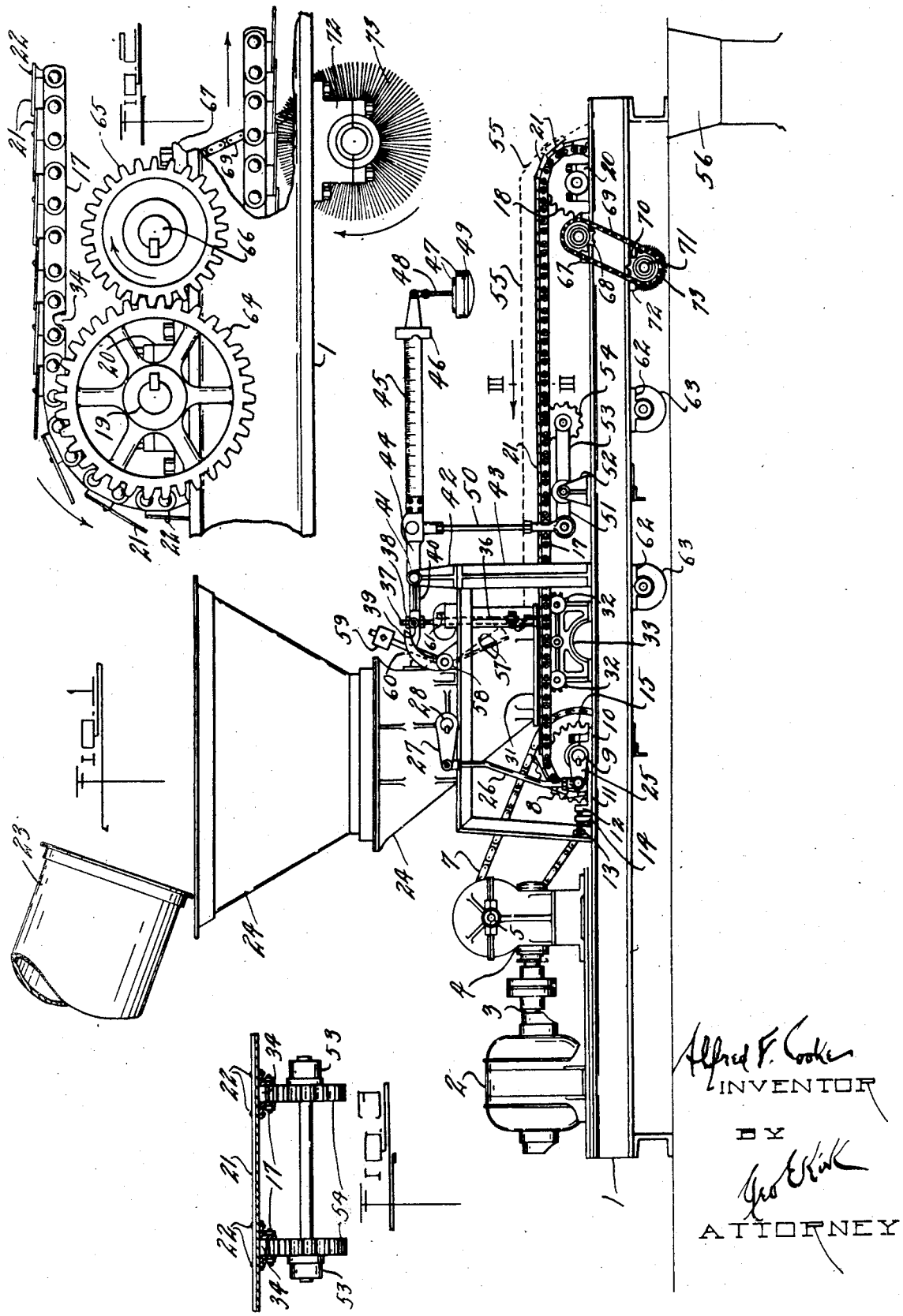

Aug. 9, 1927. 1,638,244
A. F. COOKE
CONTINUOUS WEIGHING APPARATUS
Filed March 5, 1926    2 Sheets-Sheet 2
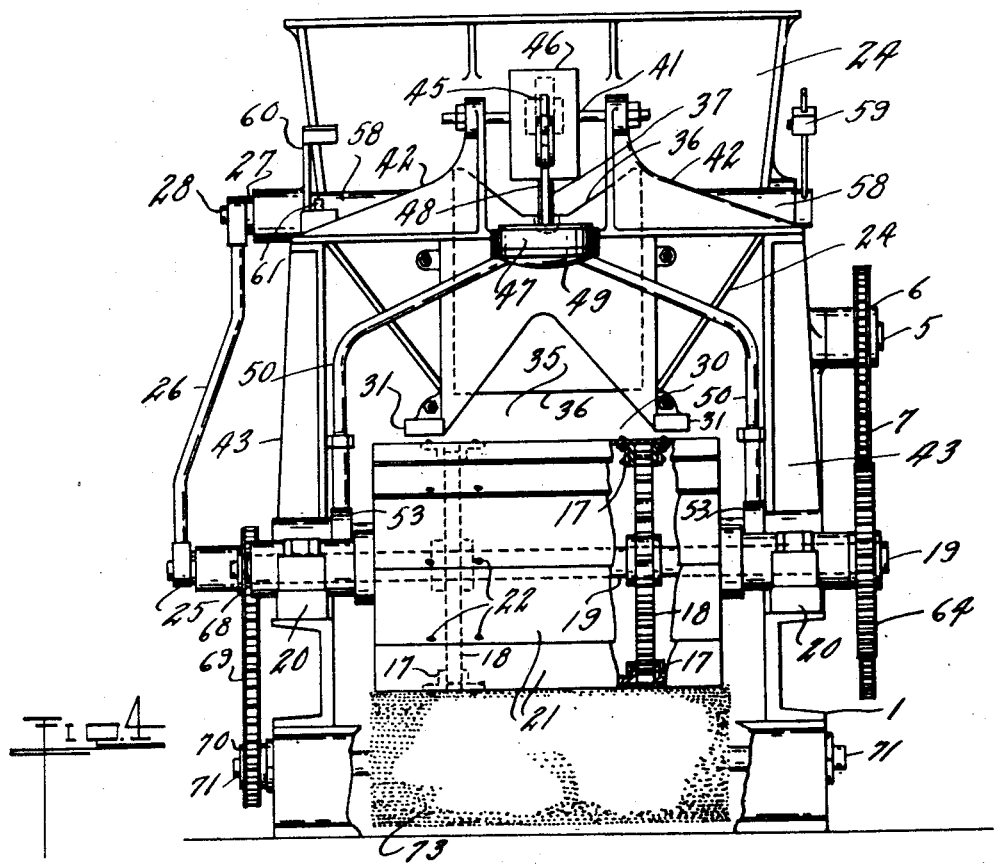
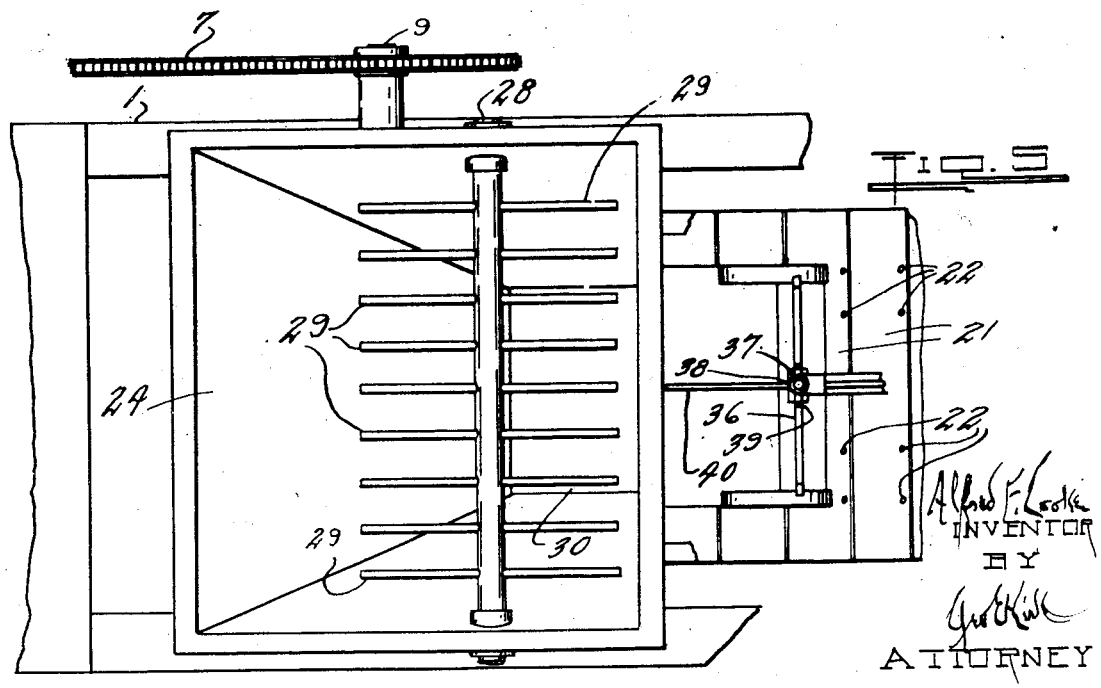

Patented Aug. 9, 1927.

1,638,244

UNITED STATES PATENT OFFICE.

ALFRED F. COOKE, OF PITTSBURGH, PENNSYLVANIA, ASSIGNOR TO SCHAFFER POIDOMETER COMPANY, OF PITTSBURGH, PENNSYLVANIA, A CORPORATION OF PENNSYLVANIA.

CONTINUOUS WEIGHING APPARATUS.

Application filed March 5, 1926. Serial No. 92,410.

This invention relates to conveying types of feeders.

This invention has utility when incorporated in adjustable definite feed rate for weighing conveyors, especially for the handling of high temperature, equipment-attacking, sharp-edged and chemical reacting materials, the instance of the showing herein being that for handling the hot cement clinker from a cement plant installation.

Referring to the drawings:

Fig. 1 is a side elevation, with parts broken away, of an embodiment of the invention for handling hot cement clinker;

Fig. 2 is a fragmentary view of the device showing the plate cleaner connections;

Fig. 3 is a section on the line III—III, Fig. 1, looking in the direction of the arrow;

Fig. 4 is a view from the right of Fig. 1, with parts broken away; and

Fig. 5 is a fragmentary plan view of the hopper portion of the machine of Fig. 1.

Mounted on main frame 1 is electric motor 2 having shaft 3 effective through worm gear speed reduction 4 for driving shaft 5 carrying sprocket wheel 6 from which extends sprocket chain 7 about sprocket wheel 8 on shaft 9 mounted in bearing blocks 10 carried by frame 1. These bearing blocks 10 have extensions 11 to lugs 12 with which may coact bolts 13 from lugs 14 for adjusting or take-up of this bearing shaft 9.

The shaft 9 has additionally thereon a pair of sprocket wheels 15 about which extend sprocket chains 17 to follower sprocket wheels 18 on shaft 19 carried by blocks 20 on the frame 1.

The parallel chains 17 have extending transversely thereof parallel plates 21 anchored by rivets 22 to the chains. These rivets 22 are disposed in or adjacent the after-edge of the respective plates 21 with the upper reach of these chains or endless belts so positioning the remote transverse edge of the plates 21 that such edge overlaps, as a ledge, at the advance side of such plate extending over the after-edge of the preceding plate 21 thereby providing a minor sort of flight for this endless conveyor.

Supply chute 23, say as a rotary cooler from a cement burner plant, may discharge the hot clinker into hopper 24. The shaft 9 is provided with crank 25 from which extends upward link 26 to crank 27 on rock shaft 28 through the hopper 24. This rock shaft 28 in this hopper 24 is provided with agitating arms 29 which in the rocking of the shaft 28 serve to maintain the material loosened or against lodging in this hopper. The hopper 24 has open bottom discharge 30 having lateral shoes 31 in proximity to the endless conveyor or feeder belt having the plates 21. The load of material from this hopper 24 as thus discharging upon the plates 21 is sustained against sagging by toothed wheels 32 mounted in frame 33 carried by the main frame 1. The teeth of these wheels 32 coact with seats 34 in the chains 17 and this device of the wheels 32 and frames 33 serves as a fixed or first sustainer for the upper reach of the traveling plates 21, herein actuated by the motor 2 to travel from the live shaft 9 about the sprocket wheels 18 about the follower shaft 19.

In this direction of travel the material in the hopper 24 is drawn therefrom by the overlapping edges of the plates 21, as well as by the travel of such plates. The depth of this withdrawal is permitted by clearance 35 in the side of the hopper away from the motor 2. The effective range of this clearance or opening 35 is adjusted by gate 36 having upstanding stem 37 adjustably connected by nuts 38 to rock shaft 39 mounted in arm 40 of lever having fixed fulcrum 41 in bracket 42 uprising from the frame 43 mounted on the main frame 1. This lever arm 40 is rigid with lever arm 44 carrying graduated beam 45 upon which is slidable weight 46. Additional adjustment for the action of this scale beam or lever 40, 45, may be had by varying weights 47 as sustained by link 48 and pan 49.

From the arm 44, there depends spread link 50 to short arms 51 pivotally mounted in fulcrum bearings 52 sustained by the frame 1 below the upper reach of the traveling plates 21. This lever 51 has long arms 53 carrying toothed wheels 54 coacting with the seats 34 of the respective chains 17, thus providing a second or shiftable sustaining means for the upper portion or reach of the traveling plates 21. As the load of hot material from the hopper 24 is in excess of that to which the scale beam is adjusted for having this material 55 discharge into way 56, the toothed wheels 54 as held for maintained lineal travel rate by the said coaction, is such that the chains 17 rock on the fulcrum 52 shoving scale beam arm 44 upward to thus have the gate 36 reduce the clearance at the opening 35 and check the total quantity of material to be withdrawn from the hopper at the prescribed travel rate as effected by the motor 2, and if the material supplied be less than that for which the weighing beam is adjusted, the roller 54 will rise and by so doing cause the gate 36 also to rise to allow increased quantity of material to be supplied as the uniform feed quantity 55 on this upper reach of the plates 21.

In the event the withdrawal rate exceeds the supply of material to this hopper 24, or that there should be lodgment or other disturbance whereby the feed of material may not be maintained from this hopper 24, such absence of material in the lower part of the hopper 24 is herein automatically controlled as responsive for shutting down the motor 2. This is effected by vane 57 in the lower portion of the hopper 24. This vane 57 is mounted on bearing 58 and is controlled by adjustable counterweight 59 to be swung at all times into the mass of material in the lower portion of the hopper 24. As the material is exhausted from this portion of the hopper 24, this counterweight 59 swings the vane 57 so that arm 60 may strike push button switch 61 and thereby stop the motor 2, so long as the counterweight 59 holds the switch 61. As the material is supplied and the vane 57 is thus rocked, there may be at once closing of this switch 61 as the arm 60 swings away therefrom and the device will automatically start.

Bearing blocks 62 carried by the under portion of the frame 1, mount rollers 63 for sustaining the lower reach of these plates 21 in their idle or return travel.

The disclosure herein is of special value in the handling of materials which in themselves offer exceptional problems. The instance herein shown has to do with the handling of hot materials, cement being taken, although there may be clinker, sand, slag, coal, or coke. Some of these materials, or others, may have harsh edges, as also for instance broken glass. Again the materials may be corrosive or have a chemical action to which end the plates 21 may be dressed to resist such as by plating or coating. In the discharge travel of these plates, due to the fact that the forward edge is overlapping, there is a throwing of the material out of or away from clogging the chains as these plates pass about the follower sprockets 18. Some of the materials may be hygroscopic or have other properties tending toward adherence of the plates. To overcome such difficulties, the shaft 19 is provided with gear wheel 64 in mesh with pinion 65 on shaft 66 carried by bearing block 67 mounted on the frame 1. This shaft 66 has sprocket wheel 68 thereon about which extends sprocket chain 69 to sprocket wheel 70 on shaft 71 mounted by brackets 72 to the under side of the frame 1, there mounting rotary wire brush 73 parallel with the sustaining rolls 63 for this under reach of the belt. Accordingly, this wire brush 73 in its rotation against the plates 21 clears such plates of adhering material at once the plates are dumped into the chute 56 so that the sustaining rollers 63 may not tend to crowd or pack such material against or between the plates 21.

The disclosure herein is an improvement on the feeder of U. S. Patent 1,419,946, Schaffer, June 20, 1922.

What is claimed and it is desired to secure by United States Letters Patent is:

1. A hopper having a bottom opening, endless traveling plates providing a movable closure for the opening, sustaining means for the plates at the opening, a series of seats movable with the plates, an additional plate sustaining shiftable means including a toothed wheel coacting with said plate seats, said hopper having clearance on the side thereof toward said additional sustaining means, a gate for varying said clearance and connected to said additional sustaining means to be adjusted thereby, and a toothed wheel drive positively interlocked with the plate seats for driving the series of plates from the hopper toward said additional sustaining means.

2. A hopper having a bottom opening, a series of plates providing a movable closure for the opening, a plate assembling endless chain providing seats, a first fixed plate sustainer at the hopper opening having toothed driving wheels engaging said chain seats as a positive interlocking drive to maintain the plates in position at the hopper bottom opening, a second sustainer comprising a toothed wheel engaging said seats, said hopper having clearance above the plates and toward the second sustainer, a gate for varying said effective clearance, and adjustable connections from the gate to said second sustainer whereby loading on the plates from the hopper may be effective through said second sustainer connections and toward the position of clearance of said gate.

3. A hopper having a bottom opening, a plate providing a closure for said opening, a pair of endless parallel chains having seats, toothed wheels interlocking with said chain seats in providing a positive drive for effecting continuous uniform travel of the chains and plates in one direction as to a reach thereof coacting as a closure for said hopper bottom, said plates being assembled on said chain transversely of the plate travel, the plates being parallel and overlapping and the forward side of the plates being upward as forming the bottom for the hopper in providing pushing ledges while passing under the hopper, thereafter a second sustainer having toothed wheels coacting with the chains for sustaining the plates as leaving the hopper opening, said hopper having clearance as to the plates on the side thereof toward the second sustainer, a gate for varying said clearance, and adjustable connections shiftably mounting the second sustainer for thereby moving said gate in controlling loading of the plates.

In witness whereof I affix my signature.

ALFRED F. COOKE.